(12) United States Patent
Boening et al.

(10) Patent No.: US 9,624,979 B2
(45) Date of Patent: Apr. 18, 2017

(54) TURBOCHARGER HAVING A BEARING BLOCK DEVICE FOR A TURBOCHARGER HOUSING DIVIDED IN THE LONGITUDINAL DIRECTION

(75) Inventors: Ralf Boening, Reiffelbach (DE); Ralph Maurice Koempel, Mannheim (DE); Holger Faeth, Fussgoenheim (DE)

(73) Assignee: Continental Automotive GmbH, Hannover (DE)

( * ) Notice: Subject to any disclaimer, the term of this patent is extended or adjusted under 35 U.S.C. 154(b) by 1058 days.

(21) Appl. No.: 13/509,640

(22) PCT Filed: Nov. 4, 2010

(86) PCT No.: PCT/EP2010/066839
§ 371 (c)(1),
(2), (4) Date: May 14, 2012

(87) PCT Pub. No.: WO2011/057950
PCT Pub. Date: May 19, 2011

(65) Prior Publication Data
US 2012/0257966 A1 Oct. 11, 2012

(30) Foreign Application Priority Data
Nov. 13, 2009 (DE) ........................ 10 2009 053 237

(51) Int. Cl.
| | |
|---|---|
| *F01D 25/14* | (2006.01) |
| *F01D 25/18* | (2006.01) |
| *F16C 35/02* | (2006.01) |
| *F01D 25/16* | (2006.01) |
| *F01D 25/24* | (2006.01) |
| *F02C 6/12* | (2006.01) |

(Continued)

(52) U.S. Cl.
CPC ............ *F16C 35/02* (2013.01); *F01D 25/162* (2013.01); *F01D 25/24* (2013.01); *F02C 6/12* (2013.01); *F04D 25/024* (2013.01); *F04D 29/0563* (2013.01); *F04D 29/4206* (2013.01); *F04D 29/624* (2013.01); *F05D 2220/40* (2013.01); *F05D 2240/14* (2013.01); *F16C 2360/24* (2013.01)

(58) Field of Classification Search
CPC .. F04D 29/0563; F05D 2240/14; F01D 25/14; F01D 25/18
USPC ..... 415/170.1, 175, 178, 213.1, 229; 60/597
See application file for complete search history.

(56) References Cited

U.S. PATENT DOCUMENTS 2,860,827 A 11/1958 Egli
4,541,786 A * 9/1985 McLean ..................... 417/407
(Continued)

FOREIGN PATENT DOCUMENTS

CN 1928335 A 3/2007
CN 101429878 A 5/2009
(Continued)

*Primary Examiner* — Sean J Younger
(74) *Attorney, Agent, or Firm* — Laurence A. Greenberg; Werner H. Stemer; Ralph E. Locher

(57) ABSTRACT

A turbocharger has a turbocharger housing having at least one section divided along a longitudinal axis into at least two housing halves. A bearing block device is provided in the turbocharger housing and receives a shaft and impellers of the turbocharger. The shaft with the impellers can be pre-assembled in the bearing block device and then inserted into the turbocharger housing.

20 Claims, 9 Drawing Sheets

(51) Int. Cl.
    *F04D 29/056*     (2006.01)
    *F04D 29/42*     (2006.01)
    *F04D 29/62*     (2006.01)
    *F04D 25/02*     (2006.01)

(56) References Cited

U.S. PATENT DOCUMENTS

| | | | |
|---|---|---|---|
| 4,704,075 A * | 11/1987 | Johnston et al. | 417/407 |
| 4,815,184 A * | 3/1989 | Johnston et al. | 29/889.2 |
| 4,979,881 A * | 12/1990 | Gutknecht | 417/407 |
| 5,102,305 A * | 4/1992 | Bescoby et al. | 417/407 |
| 6,425,743 B1 | 7/2002 | Fischer | |
| 7,025,579 B2 | 4/2006 | Woollenweber et al. | |
| 2003/0072509 A1 | 4/2003 | Woollenweber | |
| 2004/0200215 A1 | 10/2004 | Woollenweber et al. | |
| 2008/0232962 A1 | 9/2008 | Agrawal et al. | |
| 2008/0260521 A1* | 10/2008 | Werro et al. | 415/170.1 |

FOREIGN PATENT DOCUMENTS

| | | | |
|---|---|---|---|
| DE | 4330380 A1 | 3/1995 | |
| DE | 19758642 C2 | 7/2002 | |
| WO | 2005059331 A2 | 6/2005 | |

\* cited by examiner

TURBOCHARGER HAVING A BEARING BLOCK DEVICE FOR A TURBOCHARGER HOUSING DIVIDED IN THE LONGITUDINAL DIRECTION

BACKGROUND OF THE INVENTION

Field of the Invention

The invention relates to a bearing block device for a turbocharger housing divided in the longitudinal direction into at least two housing halves, and to a turbocharger housing and a turbocharger having such a bearing block device.

A turbocharger generally comprises an exhaust turbine which is arranged in an exhaust gas mass flow and is connected via a shaft to a compressor in the intake tract. The turbine rotor of the turbine here is arranged in a turbine housing and the compressor wheel of the compressor in a compressor housing. The shaft is in turn supported in a bearing housing. In operation the turbine rotor is driven by the exhaust gas mass flow and in turn drives the compressor wheel. Here the compressor compresses the intake air and delivers this to the internal combustion engine.

Existing turbocharger designs provide for individual housings, which are fastened, strung together in series, and sealed off from one another. In a new form of turbocharger housing according to the invention the turbocharger housing is now to be divided in the longitudinal direction and not, as hitherto, transversely to its longitudinal axis. This new turbocharger housing and the sealing of the housing halves relative to one another form the subject matter of a separate patent application.

BRIEF SUMMARY OF THE INVENTION

The object of the present invention, therefore, is to provide a turbocharger having a turbocharger housing divided in the longitudinal direction, having a seat for the rotor runner of the turbocharger.

This object is achieved by a turbocharger having a bearing block device with the features according to the claims.

Accordingly, according to the invention a turbocharger is provided having a turbocharger housing, wherein at least one portion of the turbocharger housing is divided in the longitudinal direction into at least two housing halves, wherein a bearing block device, which receives the shaft and the rotors of the turbocharger, is provided in the turbocharger housing.

The turbocharger here has the advantage that the shaft with the rotors can be preassembled in the bearing block device and then inserted into the turbocharger housing. In addition, the bearing block device, which allows preassembly of the rotor runner of the turbocharger, serves to improve the balancing of the rotating parts. As a result, the balancing of the part can be performed before fitting into the turbocharger housing.

Advantageous configurations and developments of the invention are set forth in the dependent claims and the description with reference to the drawings.

The invention is explained in more detail below with reference to exemplary embodiments indicated in the schematic figures of the drawings, of which:

DESCRIPTION OF THE INVENTION

Figure 1:
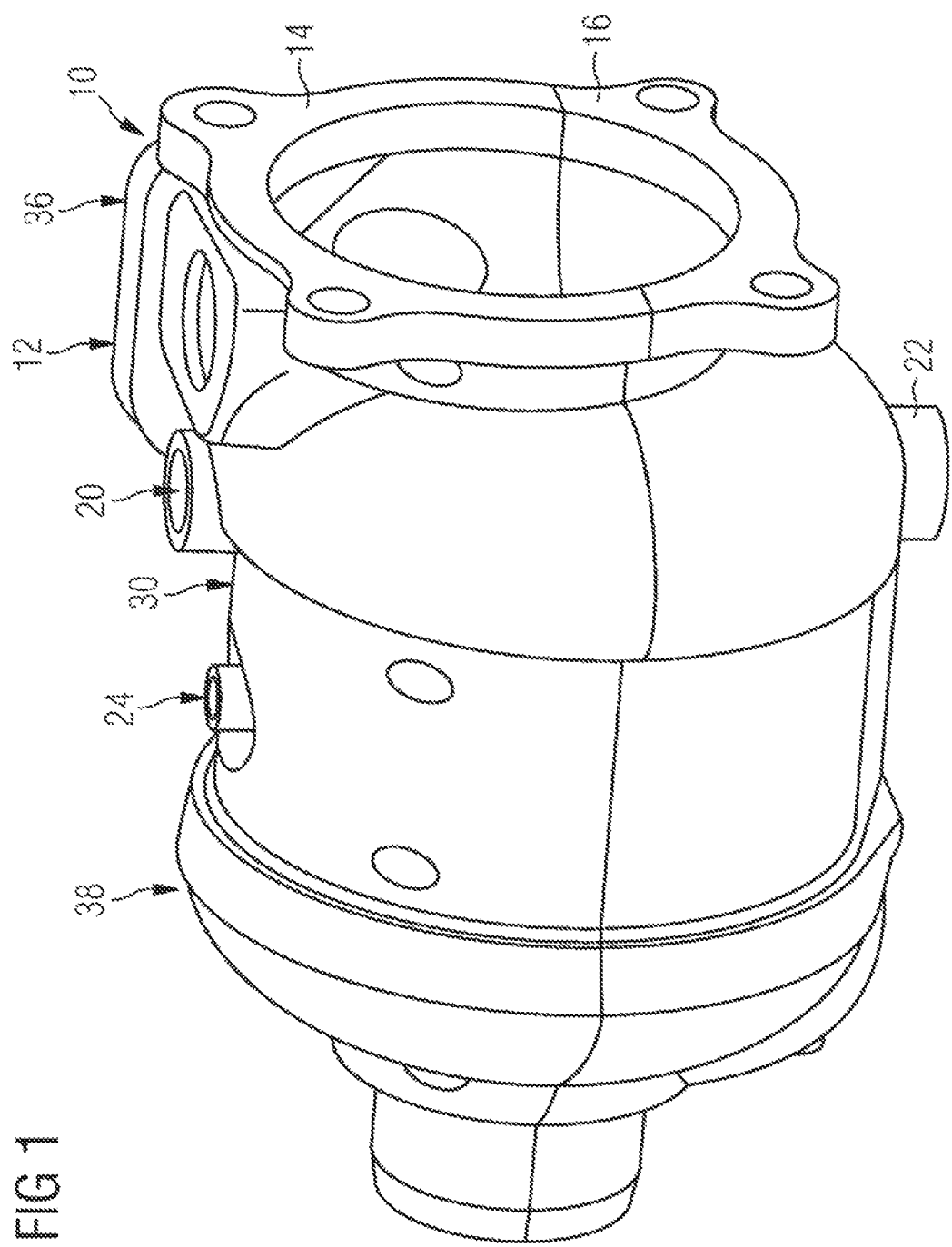
FIG. 1 shows a perspective view of a turbocharger, the turbocharger housing being divided into two housing halves in the longitudinal direction, for example in a horizontal plane.

Unless otherwise stated, the same or functionally equivalent elements and devices have been provided with the same reference numerals in all figures. The representation of the turbocharger shown in the following figures is moreover purely schematic, not to scale and highly simplified.

FIG. 1 shows a perspective view of a turbocharger 10 and its turbocharger housing 12. Here the turbocharger housing 12 is divided in the longitudinal direction into at least two housing halves 14, 16. In the example shown in FIG. 1, the turbocharger housing 12 is divided in a horizontal plane in the longitudinal direction, the longitudinal axis of the turbocharger 10 here lying in the horizontal plane. In principle, however, the turbocharger housing 12 may be divided in any plane in a longitudinal direction into at least two or more housing halves 14, 16. Furthermore, the longitudinal axis or the longitudinal axis of the turbocharger shaft need not lie in this plane of division or intersect this, for example, although in principle it may do so. The plane of division may also be a horizontal plane, for example, which runs parallel and offset in relation to the longitudinal axis, or the plane of division may also intersect the longitudinal axis at a predefined angle.

The turbocharger housing 12 or at least one housing half 14, 16 may be formed both as a separate part, as shown in FIG. 1, or may be integrated at least partially or substantially in its entirety into an engine block (not shown) of a connected internal combustion engine and/or at least partially or substantially in its entirety into a corresponding cylinder head or cylinder heads (not shown) of the internal combustion engine.

Figure 2:
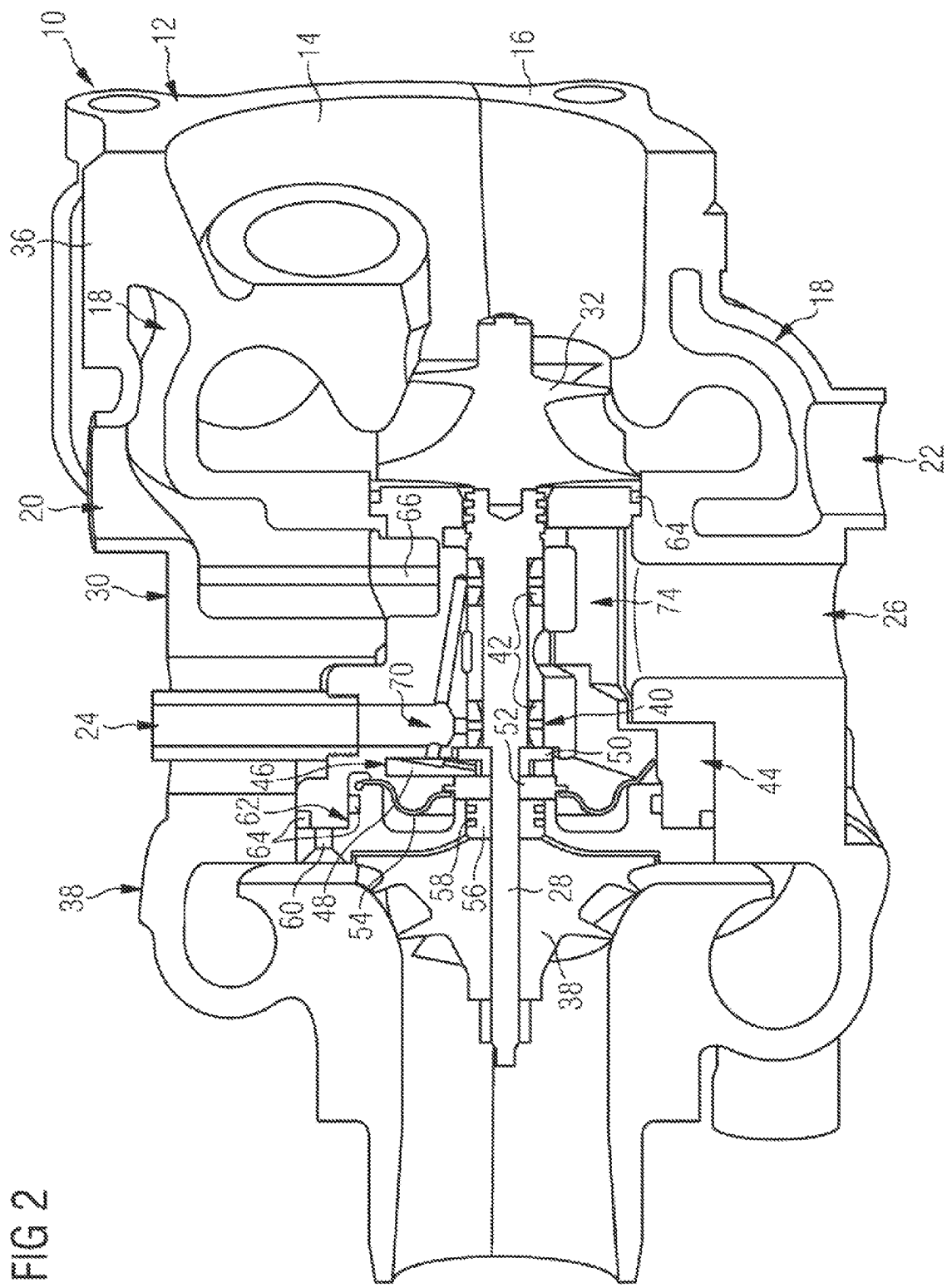
FIG. 2 shows a sectional view through the turbocharger divided in the longitudinal direction into at least two housing halves.

As shown in FIG. 2, the turbocharger housing 12 is optionally also of temperature-controlled design and comprises a temperature control jacket 18, and at least one inlet 20 and an outlet 22 for a temperature control medium, such as water, for example. The turbocharger housing 12 furthermore comprises at least one inlet 24 and an outlet 26 for a lubricant, which are connected to a lubricant feed 70 and a lubricant discharge 74 of a bearing block device 44.

FIG. 2 shows a sectional view through the turbocharger 10 and its turbocharger housing 12 according to FIG. 1. The first housing half 14, for example, here forms an upper part with the inlet 24, 20 for the lubricant and the fluid medium. Here the inlet 24, 20 for the lubricant and/or the fluid medium may be integrally formed with housing half 14 or formed as a separate part, such as, for example, the lubricant inlet 24 in the form of a tube in FIG. 2. The second housing half 16 in turn forms a lower part of the turbocharger housing 12 with a lubricant outlet 26 and an outlet 22 for the fluid medium. Here the lubricant outlet 26 and the outlet 22 for the fluid medium may likewise be integrally formed with the housing half 14, 16 or formed as a separate part, which is fastened in the housing half. The two housing halves 14, 16 may be impermeably connected together via at least one sealing device, which forms the subject matter of a separate patent application.

In the turbocharger housing 12 a shaft 28, on which a turbine rotor 32 and a compressor wheel 34 are arranged, is supported in a bearing housing portion 30. Here the turbine rotor 32 is arranged in a turbine housing portion 36 and the compressor wheel 34 in a compressor housing portion 38 of the turbocharger housing 12. In addition, the shaft 28 is supported in a radial direction by a radial bearing arrangement 40, for example by means of two radial slide bearings 42 and a spacer sleeve. In principle, however, any other radial bearing arrangement may be provided. That shown in FIG. 2 is purely an example and the invention is not limited to this special radial bearing arrangement. The same applies to the following axial bearing arrangement.

The radial bearing arrangement 40 with its two radial bearings 42 is received in a bearing block device 44. Furthermore, additional provision is optionally made for an axial bearing arrangement 46. The axial bearing arrangement 46 here comprises at least one axial bearing 48, for example an axial bearing disk. Here the axial bearing 48 may be arranged on an additional bearing block 50, as shown in FIG. 2, or, for example, directly on the shaft (not shown). Furthermore, an additional seating element 52 in the form of a disk, for example, which receives a heat shield 54, may be provided. An additional bushing element 56 having a sealing device, which comprises at least one or two piston rings 58 for sealing off the bearing housing portion 30 from the compressor housing portion 38, may furthermore be provided. The compressor housing 38 may comprise a separate compressor rear wall element 60, for example, as shown in FIG. 2, which is preassembled with the rotor runner on the shaft 28. Here the compressor rear wall element 60 is received in a seat 62 of the bearing block device 44, at least one sealing device 64, for example at least one O-ring, preferably being provided between the bearing block device 44 and the compressor rear wall element 60. In addition, a sealing device 64, for example at least one O-ring seal, may also be provided between the bearing block device 44 and the compressor housing 38 and/or the compressor rear wall element 60. Here the bearing block device 44 comprises the sealing device 64 on its outside, for example, for sealing the compressor housing 38 and the compressor rear wall element 60, as shown in FIG. 2.

The turbocharger housing 12 or the two housing halves 14, 16 also comprise a temperature control jacket 18, to which a temperature control medium, such as water, for example, is delivered via an inlet 20. The used temperature control medium is then discharged from the temperature control jacket 18 via an outlet 22. In this case a part of the temperature control jacket 18 for cooling and/or heating of the turbocharger housing 12 may also be formed in the bearing block device 44, as shown in FIG. 2. For this purpose, a temperature control jacket portion 66 is provided in the bearing block device 44, for example in the area of the bearing 42 and/or the turbine housing 36, as shown in FIG. 2. As is shown in FIG. 2, the bearing block device 44 is designed so that it forms a part of the rear wall of the turbine housing 36, there being no need in this example to provide an additional heat shield on the turbine side, since the bearing housing 30 and the turbine housing 36 can be cooled by the temperature control jacket 18. In principle, a separate turbine housing rear wall element (not shown) may also be provided on the shaft 28, comparable to the compressor housing rear wall element 60. The bearing block device 44 also may equally well be embodied as compressor housing rear wall element, comparable to the turbine housing rear wall element 68 of the bearing block device 44 in FIG. 2. The turbine housing rear wall element 68 of the bearing block device 44 comprises at least one sealing device 64, as shown in FIG. 2, in order to provide a seal between the turbine housing 36 and the bearing block device 44.

In addition, the bearing block device 44 comprises a lubricant feed 70, having at least one or more lubricant ducts 72 to a lubricant chamber 76 in the bearing block device 44 and at least one or both of the radial bearings 42 and/or the axial bearing 48. The lubricant feed 70 of the bearing block device 44 here is preferably designed so that it can be connected to the lubricant inlet 24 of the turbocharger housing 12. In addition, the bearing block device 44 also comprises a lubricant discharge 74, which is designed so that it can be connected to a lubricant outlet 26 of the turbocharger housing 12.

Figure 3:
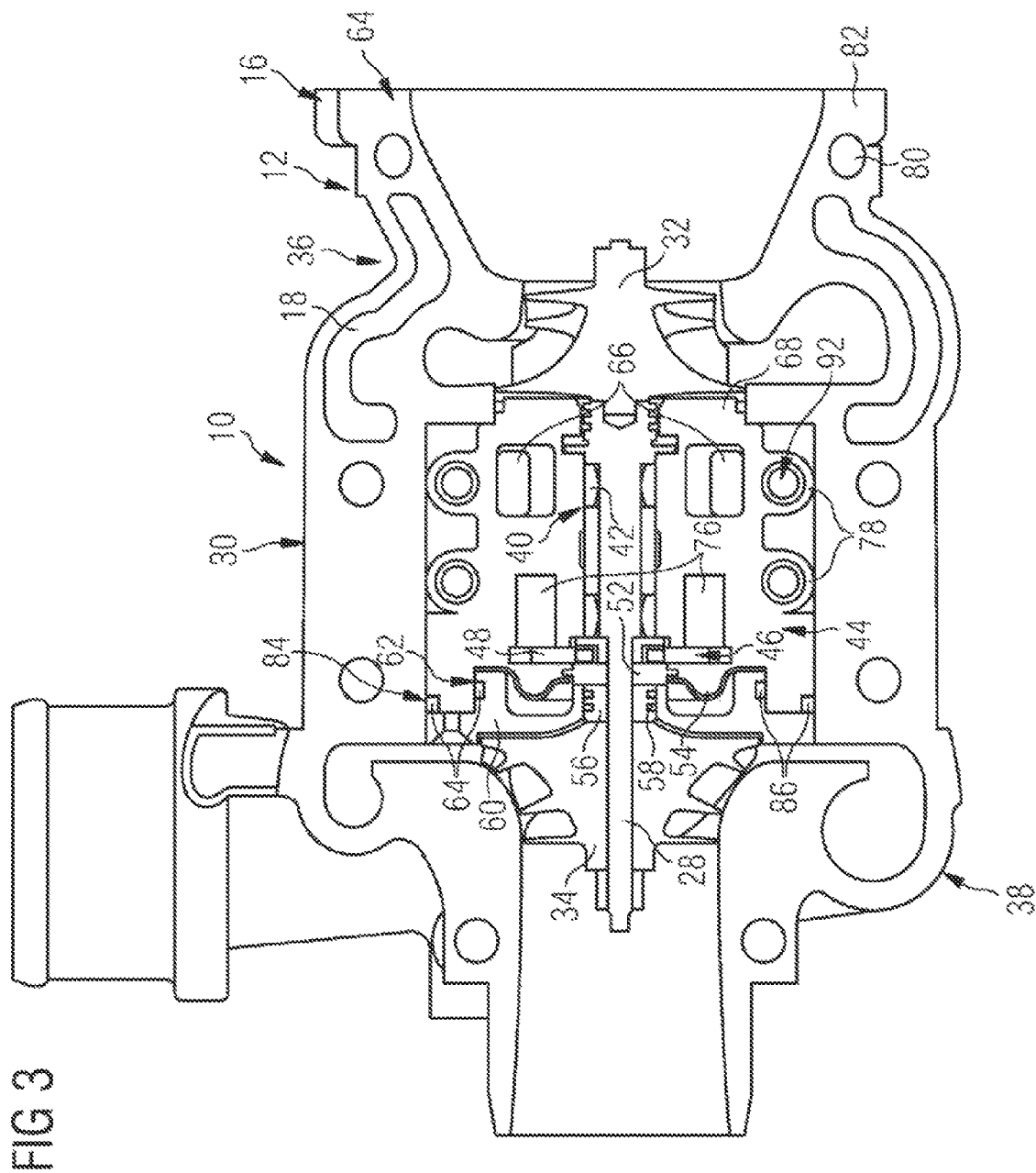
FIG. 3 shows a top view of the lower housing half of the turbocharger according to FIG. 1, showing the interior of the turbocharger in a sectional view.

Also shown in FIG. 3 is a top view of the lower housing half 16 of the turbocharger 10 according to FIG. 1, the interior of the turbocharger 10 being shown in a sectional view. For fastening the bearing block device 44 in a housing half 16, the bearing block device 44 comprises at least one or more shackles 78, via which the bearing block device 44 can be fastened to the housing half 16, for example by bolting and/or dowelling. The view in FIG. 3 shows the temperature control jacket portion 66 and the lubricant chamber 76 of the bearing block device 44 for lubricating the bearing arrangement or bearing arrangements 40, 46 of the turbocharger. The lower housing half 16 in FIG. 3 is fastened to the corresponding upper housing half by means of bolts, for example. For this purpose, the housing half 16 in FIG. 3 comprises at least one or more bores 80 for the bolts. For impermeable connection of the two housing halves 16, a sealing device 64 is provided between the two housing halves 16, for example a bead seal 82, e.g. a metal bead seal, which at least in one portion may optionally be additionally provided with a rubber material or material combination, and/or an elastomer seal. The invention is not limited to these examples of sealing devices 64, however. In principle any other sealing device 64, which is suitable for impermeably connecting the two housing halves 16 together, may be used.

Figure 4:
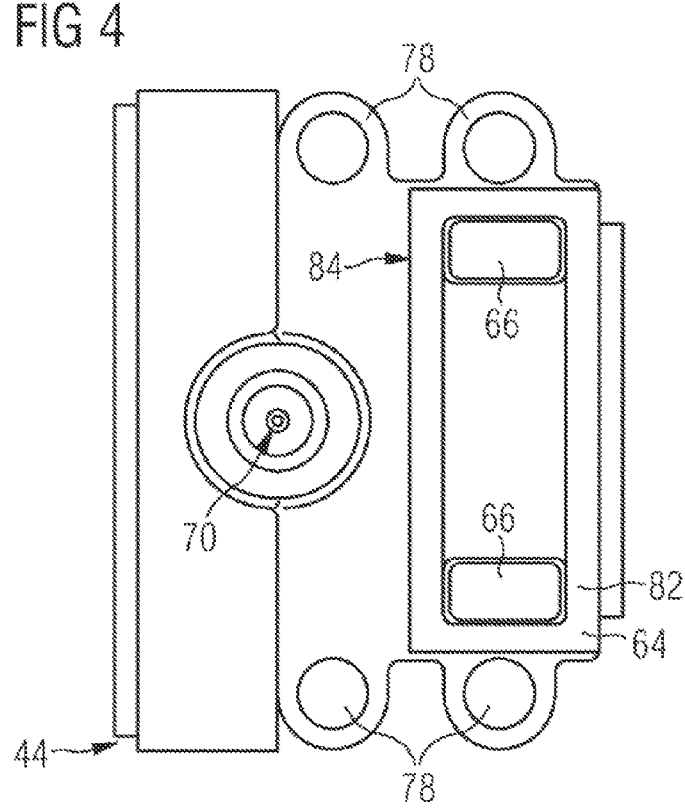
FIG. 4 shows a top view of a bearing block device according to one embodiment of the invention.

FIG. 4 now shows a top view of the bearing block device 44 according to the invention. The bearing block device 44 here additionally comprises at least one or more fastening shackles 78, for example, for fastening the bearing block device 44 to one or both housing halves 14, 16. In addition the bearing block device 44 comprises a temperature control jacket portion 66, for example a cooling water jacket portion, which can be connected to a temperature control jacket portion of the respective housing half. This temperature control jacket portion 66 may be sealed separately. In addition, the bearing block device 44 comprises a lubricant inlet 70 and lubricant outlet (not shown). For sealing off the temperature control jacket portion 66, the bearing block device 44, for example, comprises a seal seat 84, for example a plane sealing face as shown in FIG. 4, or a recess (not shown) etc., on which a sealing device 64, for example a bead seal 82 and/or an elastomer seal, is provided.

Figure 5:
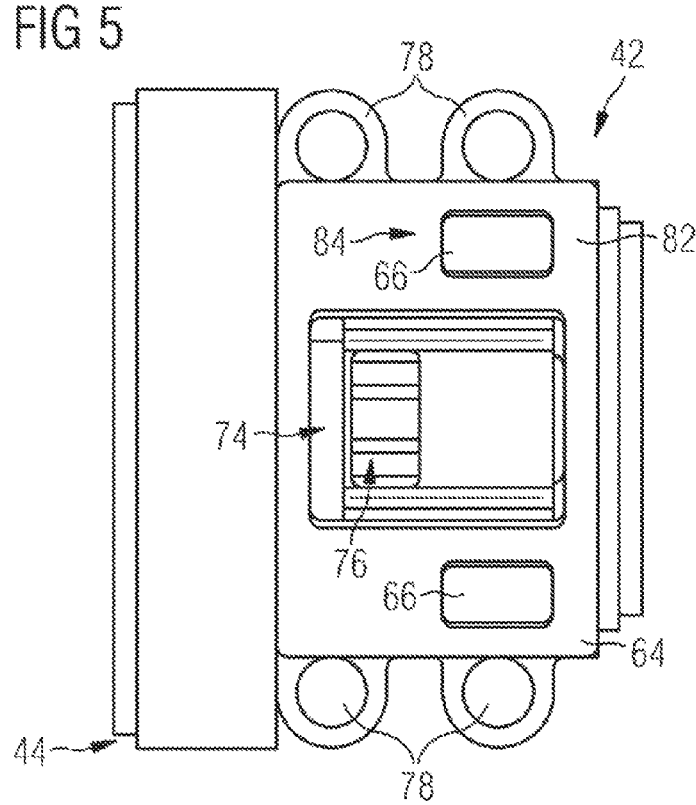
FIG. 5 shows a view of the bearing block device according to FIG. 4 from below.

FIG. 5 correspondingly shows a view of the bearing block device 44 according to FIG. 4 from below.

As is shown in FIG. 5, the bearing block device 44 comprises multiple shackles 78, for fastening the bearing block device 44 to the turbocharger housing 12, for example by bolting and/or dowelling. In the view from below FIG. 5 here shows the lubricant chamber 76 of the bearing block device 44. Here the lubricant chamber 76 is likewise sealed separately. For sealing off the lubricant chamber 76, the bearing block device 44, for example, comprises a seal seat 84, for example a plane sealing face as shown in FIG. 5, or a recess (not shown), on which a sealing device 64, for example a bead seal 82 and/or an elastomer seal, is provided. FIG. 5 further shows the temperature control jacket portion 66 of the bearing block device 44 from the underside.

Figure 6:
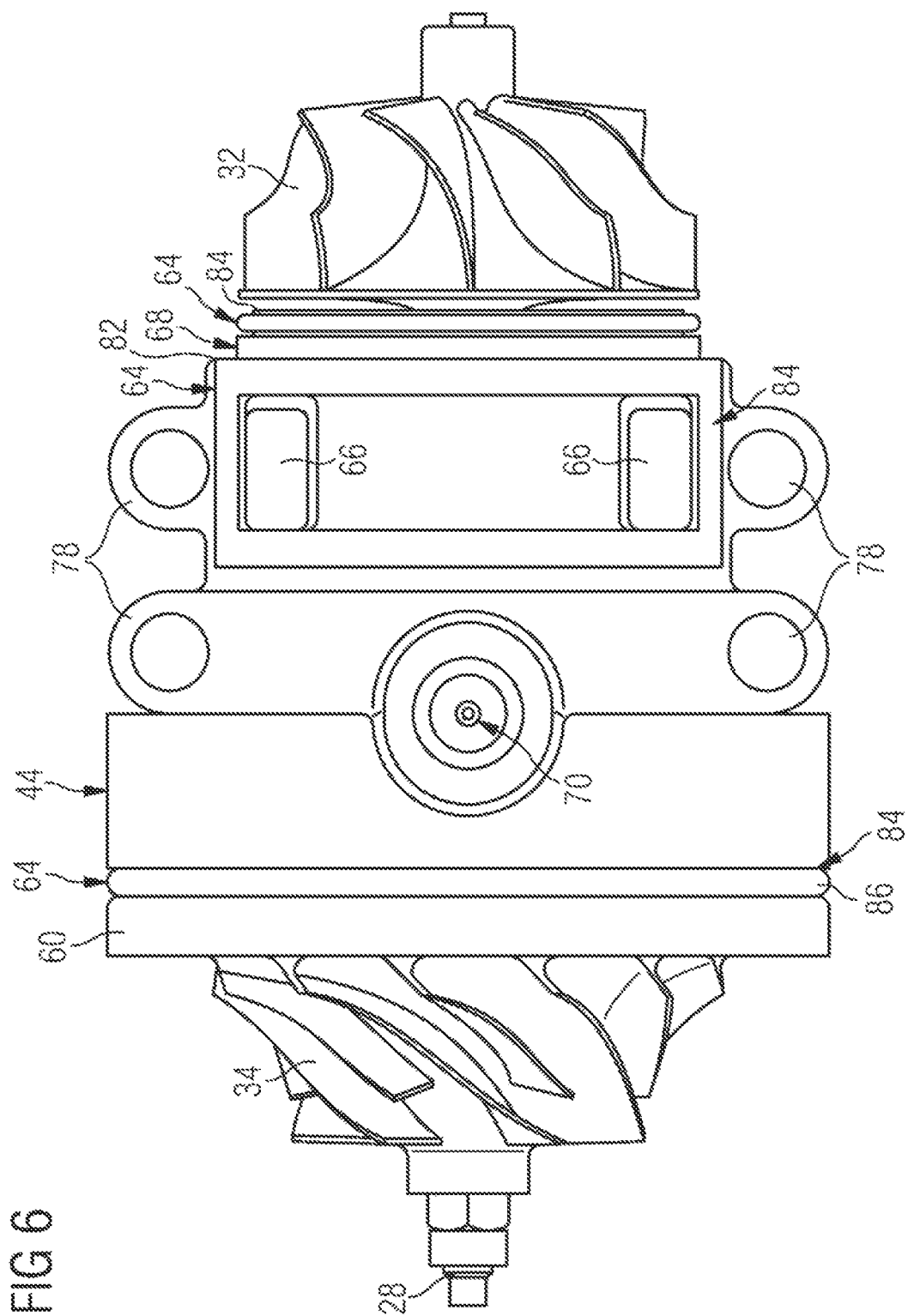
FIG. 6 shows a top view of a bearing block device, which is connected to a rotor runner of a turbocharger.

FIG. 6 furthermore shows the rotor runner of the turbocharger 10, which is received in the bearing block device 44, the bearing block device 44 being shown in top view.

As rotor runner here, the shaft 28 with its radial bearing arrangement and optionally also its axial bearing arrangement, together with the turbine rotor 32 and the compressor wheel 34, is received in the bearing block device 44. The bearing block device 44 can thus be preassembled with the rotor runner and then inserted into the housing halves of the turbocharger housing and fastened there. For this purpose, the bearing block device 44 can be fastened via the shackles 78 to the respective housing half, for example by bolting and/or dowelling. Here the temperature control jacket portion 66 of the bearing block device 44 is accordingly connected and impermeably connected to the temperature control jacket portion of the two housing halves. The lubricant inlet 70 and the lubricant outlet 74 of the lubricant chamber 76 of the bearing block device 44 are likewise connected and impermeably connected to the lubricant inlet and the lubricant outlet of the two housing halves. As is shown in FIG. 6, a compressor housing rear wall element 60 is optionally also received in a seat of the bearing block device 44, at least one sealing device 64, for example an O-ring or a piston ring seal 86, being received in a seal seat of the bearing block device 44 and/or the compressor housing rear wall element 60 for sealing the compressor housing 38, 60. In addition, a sealing device 64 is provided in a seal seat 84 of the turbine housing rear wall portion 68 of the bearing block device 44, in order to connect the turbine housing 36 and the bearing block device 44 impermeably together, so that no exhaust gas can accidentally penetrate between the turbine housing 36 and the bearing block device 44.

Figure 7:
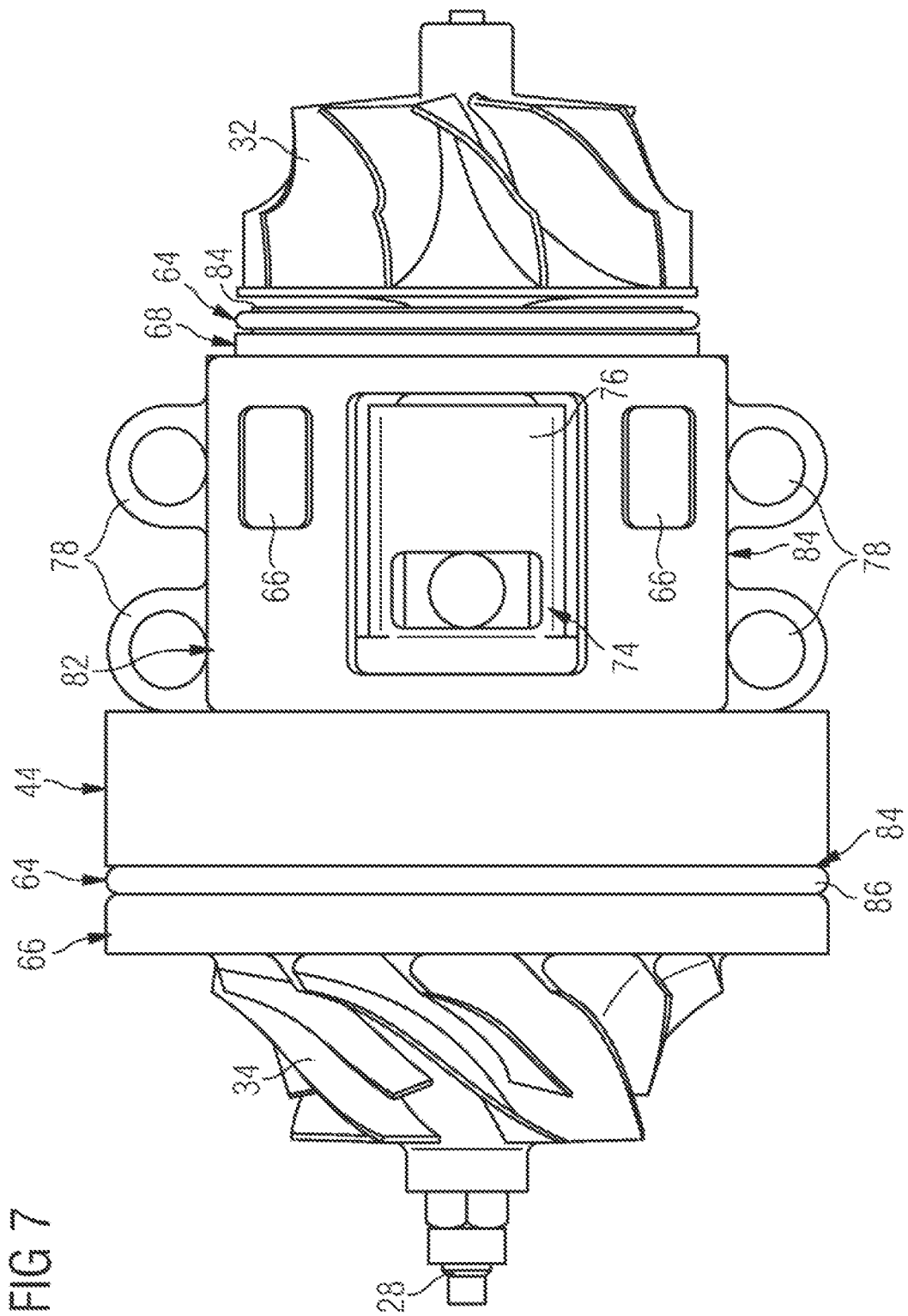
FIG. 7 shows a view of the bearing block device and the rotor runner according to FIG. 5 from below.

FIG. 7 shows a view of the rotor runner of the turbocharger 10 and the bearing block device 44 according to FIG. 6 from below. This firstly shows the temperature control jacket portion 66 of the bearing block device 44, and the lubricant chamber 76 of the bearing block device 44, which as previously explained with reference to FIG. 6 are correspondingly connected and impermeably connected to the temperature control jacket portion and the lubricant inlet and outlet of the two housing halves. For this purpose, the view in FIG. 7 shows the sealing device 64, firstly for sealing the connection of the temperature control jacket portion of the turbocharger housing to the temperature control jacket portion 66 of the bearing block device 44, and for sealing the connection between the lubricant chamber 76 of the bearing block device 44 and the lubricant outlet of the turbocharger housing. Here, at least one sealing device 64, for example a bead seal 82, as shown in FIG. 7, may be provided.

Figure 8:
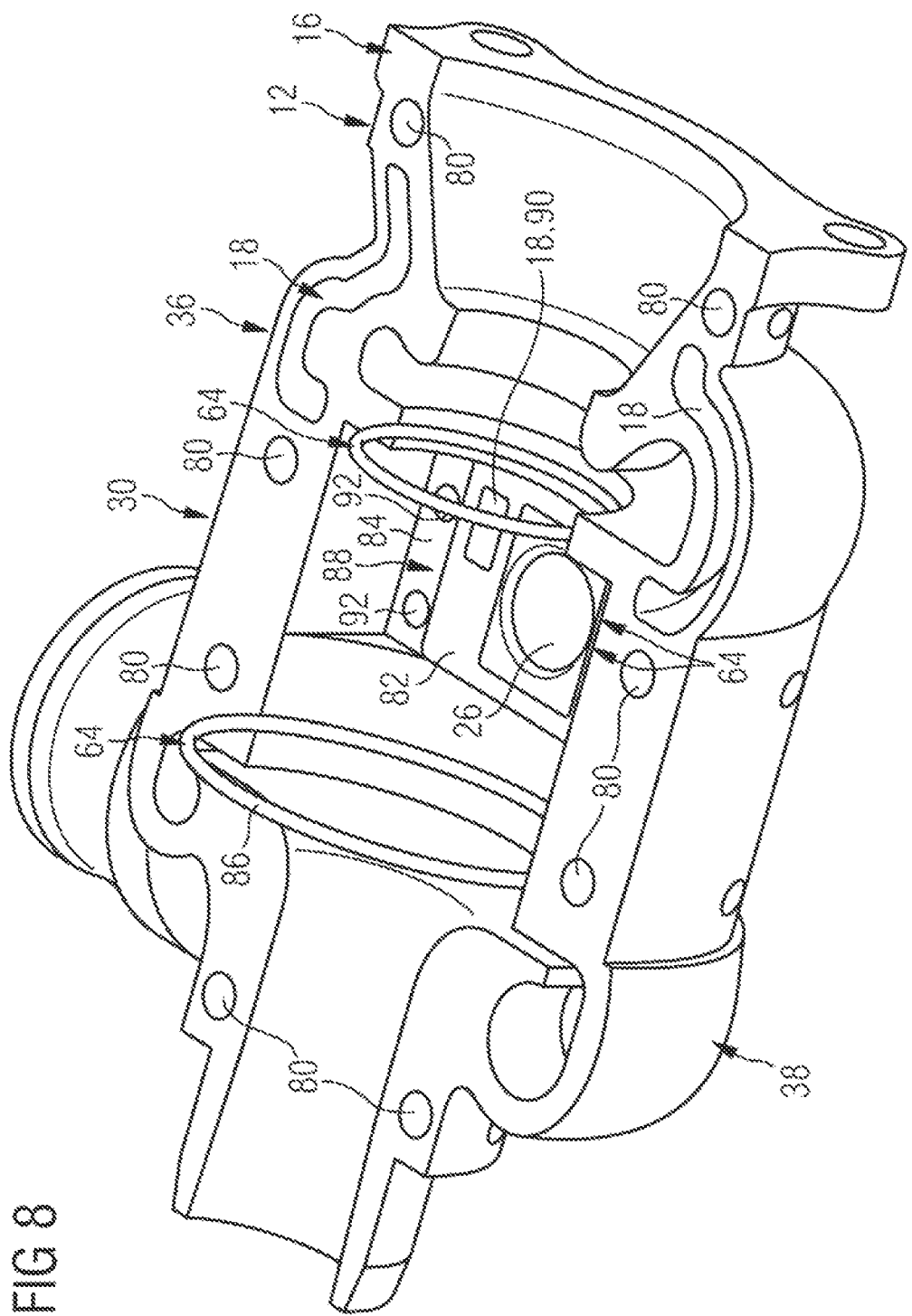
FIG. 8 shows a perspective view of the lower housing half of the turbocharger according to the invention, showing some sealing devices.

FIG. 8 now shows the second or lower housing half 16 of the turbocharger housing 12 according to FIGS. 1 and 2. The lower housing half 16, like the upper housing half in the succeeding FIG. 9, comprises the turbine housing 36, the bearing housing 30 and/or the compressor housing 38. In addition, the lower housing half 16 comprises a corresponding seat 88 for the bearing block device. The seat 88 for the bearing block device here firstly comprises a lubricant outlet 26, for connection to the lubricant outlet of the bearing block device. The seat 88 furthermore comprises a connecting portion 90 of the temperature control jacket portion 18 for the temperature control jacket portion of the bearing block device. In addition, one or more bores 92, for example, may be provided in the seat 88 for fastening or bolting the bearing block device onto the lower housing half 16 by way of its shackles. Multiple bores 80, for example, are furthermore provided in the housing half 16, for connecting the two housing halves 16, for example by bolting and/or dowelling. FIG. 8 also shows three sealing devices 64, the first sealing device 64, for example an O-ring or piston ring seal 86 or an elastomer seal, being provided in order to seal off the compressor housing 38 and the compressor housing rear wall element from the bearing block device, so that air cannot accidentally escape from the compressor. In addition, a sealing device 64, for example a bead seal 82, is provided for sealing off the connection of the temperature control jacket portion 18 and the lubricant chamber of the bearing block device from the housing half 16. Also shown is a further sealing device 64, which serves to seal off the bearing block device and the turbine housing, so that exhaust gas cannot accidentally escape from the turbine; in this case a ring seal 86, for example, may be provided.

Figure 9:
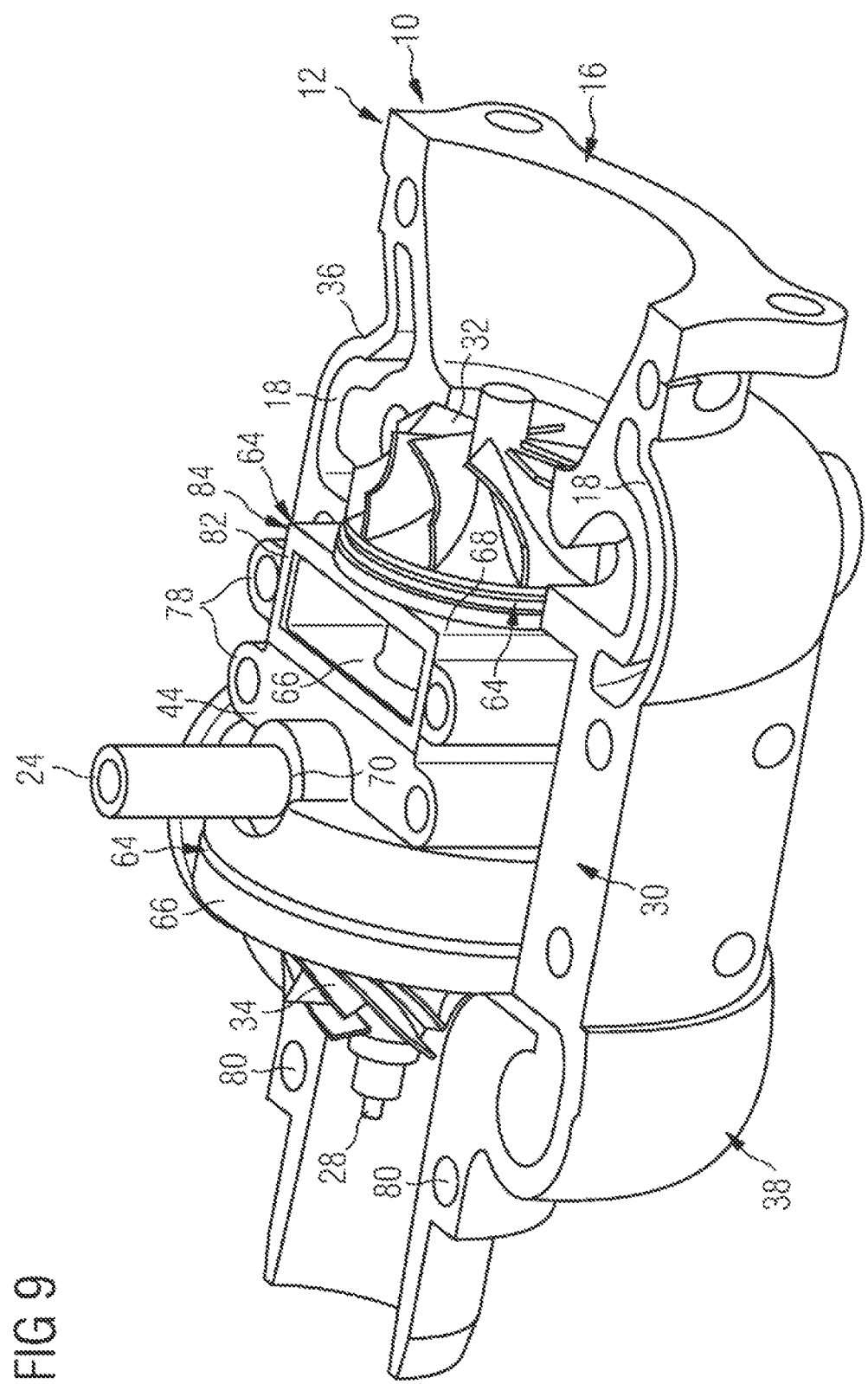
FIG. 9 shows a perspective view of the lower housing half according to FIG. 8 with bearing block device inserted and rotor runner.

FIG. 9 shows the lower housing half 16 according to FIG. 8 with rotor runner fitted and bearing block device 44. Here in the embodiment in FIG. 9 the lubricant inlet 24 is designed as a separate part, for example in the form of a tube, which is received in the bearing block device 44 and onto which the upper housing half is subsequently pushed. Besides the sealing devices 64 shown in FIG. 8, FIG. 9 also shows a further sealing device 64, for example a bead seal 82, for sealing the temperature control jacket portion 66 of the bearing block device 44.

Figure 10:
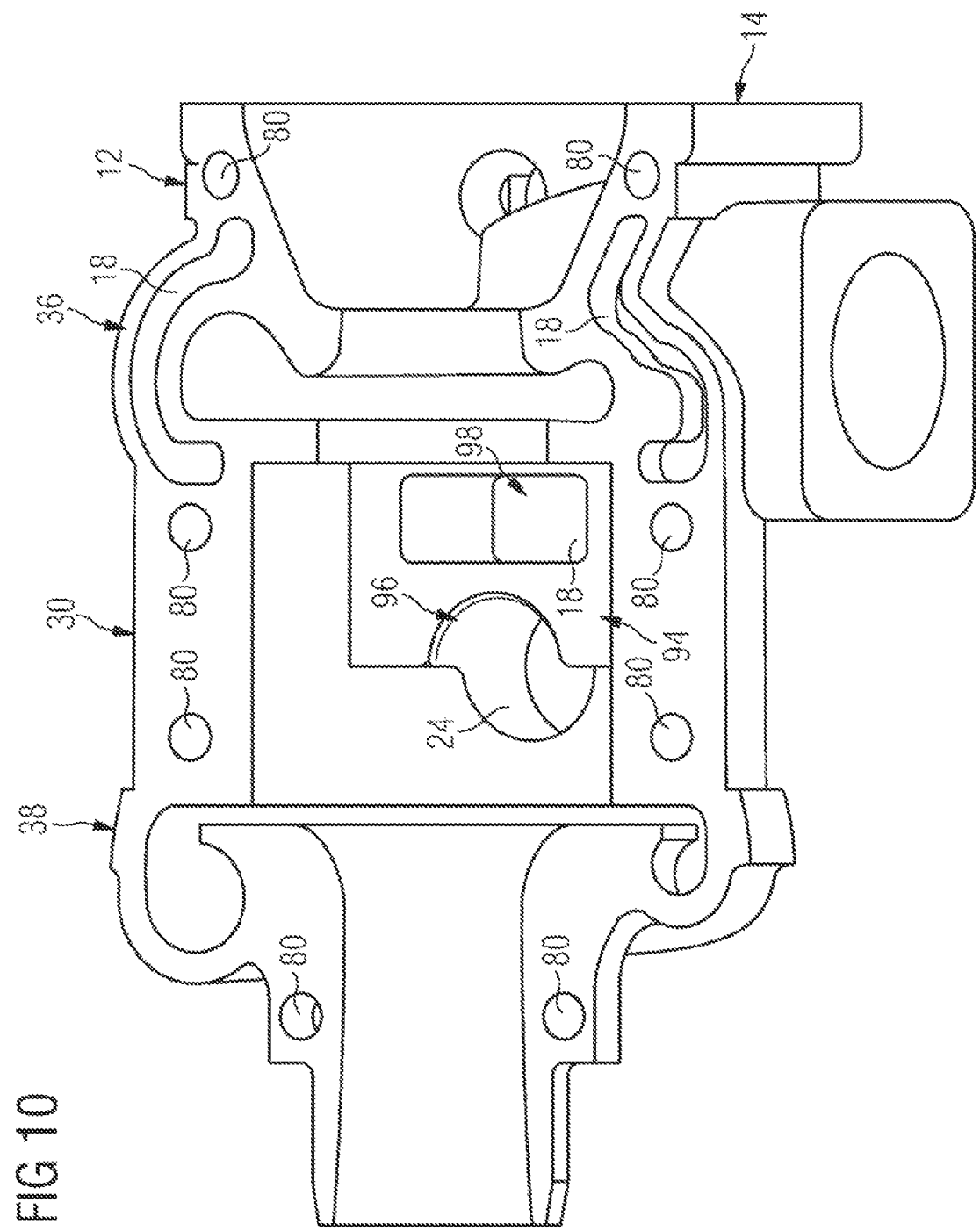
FIG. 10 shows a perspective view of an upper housing half of the turbocharger according to the invention.

FIG. 10 further shows the first or upper housing half 14 of the turbocharger housing 12 according to FIGS. 1 and 2. The upper housing half 14 likewise comprises the turbine housing 36, the bearing housing 30 and/or the compressor housing 38. The upper housing half 14 further comprises a corresponding seat 94 for the bearing block device. The seat 94 for the bearing block device here comprises a corresponding seat 96 for the lubricant inlet 24 or the tube in FIG. 9, for connection to the lubricant inlet of the bearing block device. In addition, the seat 94 comprises a connecting portion 98 of the temperature control jacket portion 18 for the temperature control jacket portion of the bearing block device, the fluid medium entering the bearing block device at the top, for example, as shown in FIG. 10. In the case of the housing halves 14, 16 shown in FIGS. 9 and 10, the temperature control jacket 18 is provided for cooling the turbocharger housing 12, for example. The temperature control jacket 18 may in principle be designed for cooling and/or heating the turbine housing 36, the bearing housing 30 and/or the compressor housing 38. In principle, the temperature control jacket 18 may also be omitted. This applies to all embodiments of the invention.

The invention is not limited to the embodiments previously described. In particular, the embodiments previously described, especially individual features of the various embodiments, may be combined with one another.

According to the invention a bearing block device, which receives the rotor runner, is fastened to a housing half or in a cylinder head, for example by bolting and/or dowelling. The media-carrying ducts and chambers, that is to say the lubricant chamber and the temperature control jacket, are sealed separately from one another. In addition, the fastening of the axial bearing and the implementation of the lubricant baffle chambers can be undertaken in the bearing block device.

One advantage of the turbocharger housing with the bearing block device according to the invention is that the seats of the bearing bushes can be machined together, so that the position relative to one another is defined. This also allows the bearing clearances to be adjustable, as hitherto. A bearing block device furthermore affords scope for accommodation of the oil chamber or lubricant chamber and the temperature control, for example water cooling, and for sealing these off from the flow-carrying ducts. In the turbocharger divided in the longitudinal direction, the bearing block device, by virtue of the divided halves, which function as two covers for the bearing block device, affords scope for production in the form of a die casting, for example, without necessarily having to resort to the use of mold cores.

A further advantage is that the fluid chamber or water chamber of the bearing block device can be brought very closely up to the point of support and/or the rear wall of the turbine, so that, for example, a cooling of the piston rings on the turbine side, for example, is ensured and an additional heat shield can be dispensed with. On the compressor side, the bearing block device affords the advantage that it receives at least one axial bearing and can thereby be fitted in the correct position relative to the radial bearing. In addition, the lubricant baffle chambers can be represented and designed in the same way as hitherto. The bearing block device allows the use of an O-ring seal externally on the cold side, which prevents the passage of flow media between the compressor side and the turbine side. As in the existing state of the art, the bearing block device implements the rotor runner as one body, which affords the possibility of balanced assembly and ease of fitting as a unit. It also provides ease of transportation as a compact sub-assembly unit.

The invention claimed is:

1. A turbocharger, comprising:
   a turbocharger housing having at least two housing halves divided in a longitudinal direction, each of said two housing halves including a temperature control jacket portion configured to receive a temperature control medium; and
   a bearing block device for receiving a shaft and rotors of the turbocharger, said bearing block device disposed in said turbocharger housing, the bearing block device forming a part of a rear wall of a turbine housing without an additional heat shield on the turbine side of said bearing block device, said bearing block device including a temperature control jacket portion connected to said temperature control jacket portions of each of said two housing halves.

2. The turbocharger according to claim 1, further comprising at least one of a radial bearing configuration or an axial bearing configuration disposed in said bearing block device.

3. The turbocharger according to claim 1, further comprising a radial bearing configuration and an axial bearing configuration disposed in said bearing block device, wherein:
   said radial bearing configuration has at least one radial bearing;
   said axial bearing configuration has at least one axial bearing;
   said bearing block device has a lubricant feed for lubricating said at least one radial bearing of said radial bearing configuration and said at least one axial bearing of said axial bearing configuration; and
   said bearing block device has a bearing housing and a lubricant chamber formed therein in an area of said bearing housing.

4. The turbocharger according to claim 3, wherein said turbocharger housing has a lubricant inlet, which is integrally formed with said turbocharger housing or is formed as a separate part, and said lubricant inlet is connected to said lubricant feed of said bearing block device.

5. The turbocharger according to claim 1, further comprising at least one sealing device selected from the group consisting of a bead seal and an elastomer seal, said temperature control jacket portion of said bearing block device is impermeably connected to said turbocharger housing via said at least one sealing device.

6. The turbocharger according to claim 3,
   wherein said bearing block device has a lubricant discharge; and
   further comprising at least one sealing device selected from the group consisting of a bead seal and an elastomer seal, at least one of said lubricant feed, said lubricant chamber or said lubricant discharge can be impermeably connected to said turbocharger housing via said at least one sealing device.

7. The turbocharger according to claim 1, further comprising a compressor wheel rear wall element disposed in said bearing block device.

8. The turbocharger according to claim 1, wherein said bearing block device has at least one shackle for fastening said bearing block device to said turbocharger housing by at least one of bolting or dowelling.

9. The turbocharger according to claim 1, wherein said bearing block device has a compressor housing rear wall portion for forming a part of a rear wall of a compressor housing.

10. The turbocharger according to claim 9, further comprising at least one sealing device for impermeably connecting said bearing block device to said turbine housing.

11. The turbocharger according to claim 9, further comprising at least one sealing device for impermeably connecting said bearing block device to said compressor housing or said compressor housing and a compressor housing rear wall element.

12. A bearing block device of a turbocharger having a turbocharger housing divided in a longitudinal direction into at least two housing halves, each of the two housing halves including a temperature control jacket portion configured to receive a temperature control medium, the bearing block device comprising:
   a bearing block body configured to receive at least one shaft and at least one rotor of the turbocharger, the bearing block device forming a part of a rear wall of a turbine housing without an additional heat shield on the turbine side of said bearing block device; and a temperature control jacket portion configured to connect to the temperature control jacket portions of each of the two housing halves.

13. The bearing block device according to claim 12, further comprising at least one of a radial bearing configuration or an axial bearing configuration disposed in said bearing block body.

14. The bearing block device according to claim 12, further comprising a radial bearing configuration and an axial bearing configuration disposed in said bearing block device, wherein:

said radial bearing configuration includes at least one radial bearing;

said axial bearing configuration includes at least one axial bearing; and said bearing block body has a lubricant feed for lubricating said at least one radial bearing of said radial bearing configuration or said at least one axial bearing of said axial bearing configuration.

15. The bearing block device according to claim 12, wherein said bearing block body is configured for receiving a compressor wheel rear wall element of the turbocharger.

16. The bearing block device according to claim 12, wherein said bearing block body contains at least one shackle for fastening said bearing block body to the turbocharger housing by at least one of bolting or dowelling.

17. The bearing block device according to claim 12, wherein said bearing block body contains at least one of a turbine housing rear wall portion or a compressor housing rear wall portion for forming a part of the rear wall of the turbine housing or a compressor housing.

18. A turbocharger housing half of a turbocharger housing, divided in a longitudinal direction into at least two housing halves, the turbocharger housing half comprising:

a temperature control jacket portion formed in the turbocharger housing half and configured to receive a temperature control medium;

a bearing block device configured to receive at least one shaft and at least one rotor of a turbocharger, the bearing block device forming a part of a rear wall of a turbine housing without an additional heat shield on the turbine side of said bearing block device, said bearing block device including a temperature control jacket portion connected to said temperature control jacket portion of the turbocharger housing half.

19. The turbocharger housing half according to claim 18, wherein said bearing block device having a lubricant feed and a lubricant discharge;

further comprising a seat for said bearing block device;

further comprising a lubricant inlet connected to said lubricant feed of said bearing block device; and further comprising a lubricant outlet connected to said lubricant discharge of said bearing block device.

20. The turbocharger housing half according to claim 19, wherein said temperature control jacket portion of the bearing block device is connected to said temperature control jacket portion of the turbocharger housing half via said seat.

* * * * *